US006178441B1

(12) United States Patent
Elnozahy (10) Patent No.: US 6,178,441 B1
(45) Date of Patent: Jan. 23, 2001

(54) METHOD AND SYSTEM IN A COMPUTER NETWORK FOR THE RELIABLE AND CONSISTENT ORDERING OF CLIENT REQUESTS

(75) Inventor: Elmootazbellah Nabil Elnozahy, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/157,425

(22) Filed: Sep. 21, 1998

(51) Int. Cl.$^7$ ............................. G06F 15/16; G06F 15/17
(52) U.S. Cl. ......................... 709/203; 709/201; 709/205; 712/245
(58) Field of Search ................................... 709/201, 203, 709/205, 245; 712/245; 714/1, 2, 4

(56) References Cited

U.S. PATENT DOCUMENTS

| | | | |
|---|---|---|---|
| 4,534,024 | 8/1985 | Maxemchuk et al. | 370/85 |
| 5,513,314 | * 4/1996 | Kandasamy et al. | 395/182 |
| 5,603,026 | * 2/1997 | Demers et al. | 395/608 |
| 5,671,407 | * 9/1997 | Demers et al. | 395/608 |
| 5,699,501 | 12/1997 | Badovinatz et al. | 395/182.02 |
| 5,713,017 | * 1/1998 | Lin et al. | 395/608 |
| 6,052,712 | * 4/2000 | Badovinatz et al. | 709/205 |

OTHER PUBLICATIONS

K. Birman, et al., "Lighweight Casual and Atomic Group Multicast", ACM Transactions on Computer Systems, vol. 9, No. 3, Aug. 1991, pp. 272–314.
Theimer, Demers, Peterson, Spreitzer, Terry, Welch Dealing with Tentative Data Values in Disconnected Work Groups, IEEE, 192–194, Jun. 1995.*
Liu, Ammaman, Jajodio, Incorporating Transaction Semantics to Reduce Reprocessing Overhead in Replicated Mobile Data Applications, IEEE, 414–422, Jun. 1995.*

* cited by examiner

*Primary Examiner*—Mark H. Rinehart
*Assistant Examiner*—Farzaneh Farahi
(74) *Attorney, Agent, or Firm*—Casimer K. Salys; Felsman, Bradley, Vaden, Gunter & Dillon, LLP (57) ABSTRACT

A method and system for reliably and consistently delivering client requests in a computer network having at least one client connectable to one or more servers among a group of servers, wherein each server among the group of servers replicates a particular network service to ensure that the particular network service remains uninterrupted in the event of a server failure. A particular server is designated among the group of servers to manage client requests which seek to update a particular network service state, prior to any receipt of a client request which seeks to update the particular network service state by any remaining servers among the group of servers. Thereafter, an executable order is specified in which client requests which seek to update the particular network service state are processed among the remaining servers, such that the executable order, upon execution, sequences the client request which seeks to update the particular network service state with respect to all prior and subsequent client requests. The executable order and the client request which seeks to update the particular network service state are automatically transferred to the remaining servers from the particular server, in response to initiating the client request. Thereafter, the client request which seeks to update the particular network service state is processed in a tentative mode at the particular server without waiting for the executable order to be executed through to completion among the remaining servers.

26 Claims, 4 Drawing Sheets

METHOD AND SYSTEM IN A COMPUTER NETWORK FOR THE RELIABLE AND CONSISTENT ORDERING OF CLIENT REQUESTS

BACKGROUND OF THE INVENTION

1. Technical Field

The present invention relates to improved methods and systems for reliable information-retrieval and updating. In particular, the present invention relates to improved methods and systems for reliable information-retrieval and data (or information) updating in distributed computer networks. More particularly, the present invention relates to improved methods and systems for reliable information-retrieval and data (or information) updating in distributed computer networks via a consistent ordering of client requests.

2. Description of the Related Art

Computer networks allow users of data-processing systems to link with remote servers, and thus retrieve vast amounts of electronic information heretofore unavailable in an electronic medium. Computer networks are increasingly displacing more conventional means of information transmission, such as newspapers, magazines, and television. A computer network connects a set of machines and allows them to communicate with one another. In such a computer network, one machine may act as a gateway that connects the computer network to other networks. The gateway handles data transfer and the conversion of messages from a sending network to protocols utilized by a receiving network.

A set of computer networks can be combined to form a so-called "Internet" when connected with one other directly or indirectly via gateways. The term "Internet" is an abbreviation for "Inter-network," and refers commonly to the collection of networks and gateways that utilize the TCP/IP suite of protocols, which are well-known in the art of computer networking. TCP/IP is an acronym for "Transport Control Protocol/Internet Protocol," a software protocol developed by the Department of Defense for communication between computers. In recent years, the Internet has allowed users to interact and share information over the networks. Because of such wide-spread information sharing, the Internet has thus generally evolved into an "open" system in which developers can design software applications for performing specialized operations or services, essentially without restriction.

Typical networked systems utilized widely today follow a client/server architecture. In network computing, a client is a process (i.e., roughly a program or task) that requests a service provided by another program, the server. The client process may utilize the requested service without having to "know" the working details of the other program or the requested service itself. In a client/server architecture, particularly a networked system, a client is usually a computer that accesses shared network resources provided by another computer (i.e., a server).

A client/server architecture acts as a framework for distributed applications that organize the flow of information between clients and servers. For example, in a stock-quotation service, a client sends requests to the server over the Internet, identifying a particular stock name. The server retrieves the desired information from one or more associated storage devices, and sends back an appropriate reply to the client over the network. This form of interaction between the client and the server is referred to as "information retrieval."

Equivalently, some sets of clients may transmit requests to update the information stored at a server storage devices. For example, a computer utilized within a stock market environment may send information to a server to refresh current stock prices. Alternatively, in the same stock market environment, a client may interact with a server in an electronic business framework to update relevant information stored at the service storage device (e.g. a stock portfolio account). This form of interaction between the client and server is referred to as "information update" or "information updating." Generally, the client process may be active in a first computer system, and the server process may be active in a second computer system, thereby communicating with one another over a computer network, while providing distributed functionality and permitting multiple clients to take advantage of the information-gathering capabilities of the server.

Such client/server architectures are often configured as distributed computer networks in which distributed servers achieve reliability and high availability utilizing replication. In such systems, several processors or machines may be utilized to provide a service, with each machine replicating the state of the service. Such machines are referred to as "server replicas" or simply "replicas". A client may communicate with a subset of server replicas to obtain and update information. Such a subset may include all, some, or only one of the available replicas. A client may select the subset randomly or via pre-defined selection criteria. It is thus necessary that all server replicas maintain identical states in order to ensure a consistent view of the information manipulated by the service, as perceived by the same client or by different clients.

If a server replica fails, the remaining server replicas continue to operate, thereby ensuring uninterrupted service for the clients. A significant problem faced by designers in implementing replicated services is to ensure that replicas maintain identical states that reflect client transactions with the service. For example, two different clients may issue an update request to the same record in a database maintained by a replicated service. If the two requests are processed in different order by two or more different replicas, the values of the record may be inconsistent at different replicas.

Ordered multicast protocols have attempted to address this problem. Ordered multicast protocols ensure that all server replicas receive the same messages from the network in the same order, thereby guaranteeing that the server replicas process identical requests and maintain identical states. A multicast protocol guarantees that all server replicas receive all client requests, even if the clients are communicating with only a subset of the servers. Commercial products that benefit from such protocols include "Web" servers, on-line transaction processing systems, stock market quotation services, general purpose file systems, electronic business servers, and so forth.

Multicast protocols do, however, impose a performance penalty because such protocols must be processed in a manner to ensure that clients requests are delivered in the same order at all server replicas. An ordering protocol requires server replicas to exchange special-purpose messages, which in turn may consume network bandwidth and delay the delivery of a request to a server program until an agreement is reached regarding the delivery order. The server program cannot begin processing the request until the ordering protocol completes its operation. The resulting performance penalty translates into a decline in communication throughput and an increase in response time. A rapid response time is increasingly necessary for successful operation in interactive client/server systems, such as Web servers, electronic business transaction services, or interactive services. Rapid response times are increasingly difficult to achieve in such interactive client/server systems utilizing traditional multicast protocols.

Based on the foregoing, it can be appreciated that a need exists for an improved method and system for implementing an ordering protocol that ensures all replicas of a server receive client requests in the same order, while offering better response time than traditional multicast protocols. It is believed that the invention described herein addresses and solves these problems.

SUMMARY OF THE INVENTION

It is therefore an object of the invention to provide an improved method and system for reliable and consistent information-retrieval and information updating.

It is another object of the invention to provide an improved method and system for reliable and consistent information-retrieval and information updating in association with distributed computer networks.

It is still another object of the invention to provide an improved method and system in a distributed computer network for reliable and consistent information retrieval and information updating via an improved ordering of client requests to a group of replicated servers.

The above and other objects are achieved as is now described. A method and system are disclosed for the reliable and consistent delivery of client requests via an ordering protocol in a computer network having at least one client connected to one or more servers among a group of servers. Each server among the group of servers replicates a particular network service to ensure that the particular network service remains uninterrupted in the event of a server failure. A client s request to retrieve information can be directed to any server replica, which in turn executes the necessary retrieval operations and responds directly to the client.

However, a client's request to update information stored within the service state may be directed to a "distinguished server replica," chosen from the group of replicated servers to receive all of the client's update requests. The distinguished server replica, upon receiving a client request to update the service state, defines an order in which all replicated servers should receive and process the update request. The order sequences the update request within all previous and future update requests, such that all replicated servers can than process all updates in a consistent order. The distinguished server replica automatically transfers the request, along with its sequence order, to the remaining server replicas.

The distinguished server replica immediately delivers the client request to the service program at the machine on which the distinguished server replica runs. This delivery occurs before the sequence information may have reached the remaining group of replicas. Delivery at the distinguished server replica occurs before all replicas receive the order in which the request should be executed, thereby producing a temporary inconsistency among the service states at different replicas. To avoid such inconsistencies from affecting the client or the server s state, the service program at the distinguished server replica executes operations necessary to carry out the update request in a "tentative mode." In a tentative mode, the updates computed by the service program are not permitted to become permanent. Old copies of the updated items are utilized to field any corresponding retrieval requests of corresponding data items. Tentative updates are thus never allowed to affect the results of retrieval requests.

When a replicated server receives an update request from the distinguished replica, it immediately sends back an acknowledgment. The replicated server then executes the update request in a tentative mode according to the order defined by the distinguished replica. After the service program executes the update request in the tentative mode at the distinguished server replica, the service program forms a response to the client and stores this response in a buffer. The response remains in a buffer until all the other server replicas transmit acknowledgments that they did in fact receive the update request and the order of the update request from the distinguished server replica. At this point, the response can be released from the buffer and returned to the client. The tentative updates become permanent and affect responses to future retrieval requests. The distinguished replica then sends confirmation messages to the other replicas, which likewise convert the tentative updates to permanent updates.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
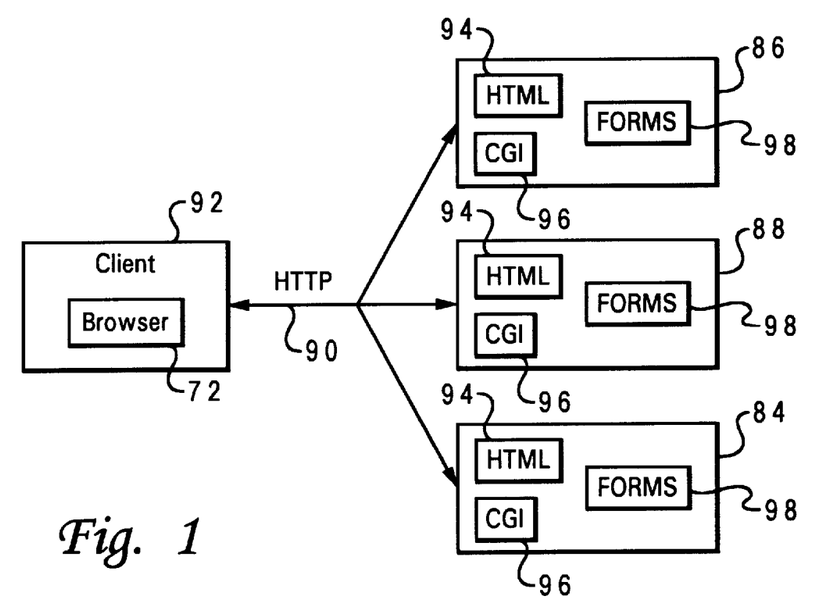
FIG. 1 depicts a block diagram illustrative of a client/replicated server architecture in accordance with a preferred embodiment of the present invention.

With reference now to the figures and in particular with reference to FIG. 1, there is depicted a detailed block diagram illustrating a client/replicated server architecture which may be implemented in accordance with a preferred embodiment of the present invention. Although the client and servers depicted in FIG. 1 represent processes generated from a high-level programming language (e.g., C++), which is interpreted and executed in a computer system at run-time (e.g., a workstation), it can be appreciated by those skilled in the art that such processes may be implemented in a variety of hardware devices, either programmed or dedicated.

In the client/replicated architecture depicted in FIG. 1, client 92 is connected to a remote service via a computer network. Active within client 92 is a first process, browser 72, which establishes the connections with remote services, presents information to users, and carries user requests to a remote service. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape, the Lynx-brand browsers, or those available which provide the functionality specified under HTTP, can be utilized in accordance with a preferred embodiment of the present invention.

In the example depicted in FIG. 1, a server process executes service program components 94, 96 and 98 to satisfy client requests, and responds to the client in the form of HTTP responses 90. HTTP responses 90 may correspond to so-called "web pages," which can be represented utilizing Hyper-Text Markup Language (HTML) 94, or the outcome of a Common Gateway Interface (CGI) program 96 that permits the client program to request the execution of a specified program contained within the replicated service. This specified program may include a search engine which scans received information in the server for presentation to the user controlling the client. This specified program may alternatively be based on a transaction processing system that performs updates in a database according to the client's particular requests. Utilizing Common Gateway Interface (CGI) program 96 in association with HTTP responses 90, the server may notify the client of the results of that execution upon completion. Additionally, the client may direct the filling out of certain "forms" from the browser. This is provided by the "fill-in-forms" functionality (e.g., forms 98) which permits a user, via a client application program, to specify terms in which the server causes an application program to function (e.g., terms or keywords contained in the articles which are of interest to the user).

A client request may retrieve information from the program service (e.g. utilizing a GET operation of HTTP protocol 90). Additionally, a client request may update information stored by the program service (e.g. utilizing a PUT operation of HTTP protocol 90). The remote service executes applications at different server replicas 84, 86, and 88 to reduce the likelihood of service unavailability due to process, machine or communication failures. Such replicas are identical and run the same software required to implement a particular service program (e.g., components 94, 96 and 98). Client 92 can send information retrieval requests and information update requests to any replica among replicas 84, 86, and 88. Replicas 84 and 86, however, redirect such requests to replica 88, which is referred to as a "distinguished replica." Such forwarding operations can occur, for instance, utilizing the "See Other" status response of the HTTP protocol (code 303), or a similar communication facility. Browser 72 is responsible for establishing connections to replicas 84, 86 and 88, as appropriate, via a name resolution protocol, such as the Internet DNS system, well known in the art. Those skilled in the art can appreciate that browser 72 utilizes performance metrics (e.g. network proximity) to choose an available server with which to interact. The client or the users are not actually aware of the specific replication aspects related to the service.

Figure 2:
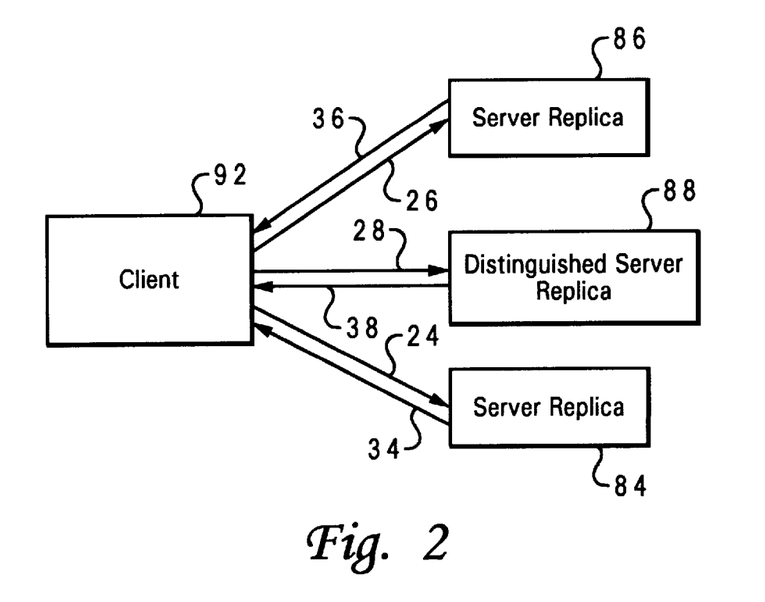
FIG. 2 illustrates a block diagram illustrative of interactions between a client and replicated servers during the execution of an information retrieval request, in accordance with a preferred embodiment of the present invention.

FIG. 2 illustrates a block diagram illustrative of interactions between client 92 and replicated servers 84, 86, and 88 during the execution of an information retrieval request, in accordance with a preferred embodiment of the present invention. In FIG. 2, user requests for information retrieval may be directed to any available replica. In particular, FIG. 2 depicts a situation in which a client may direct its request through message 24 to replica 84, through a message 26 to replica 86, or through message 28 to replica 88. For information retrieval operations, the client sends only one of these messages, for example, to the nearest available server. The program service at the chosen server replica executes the necessary retrieval information and sends back an appropriate response (message 34, 36, or 38).

Figure 3:
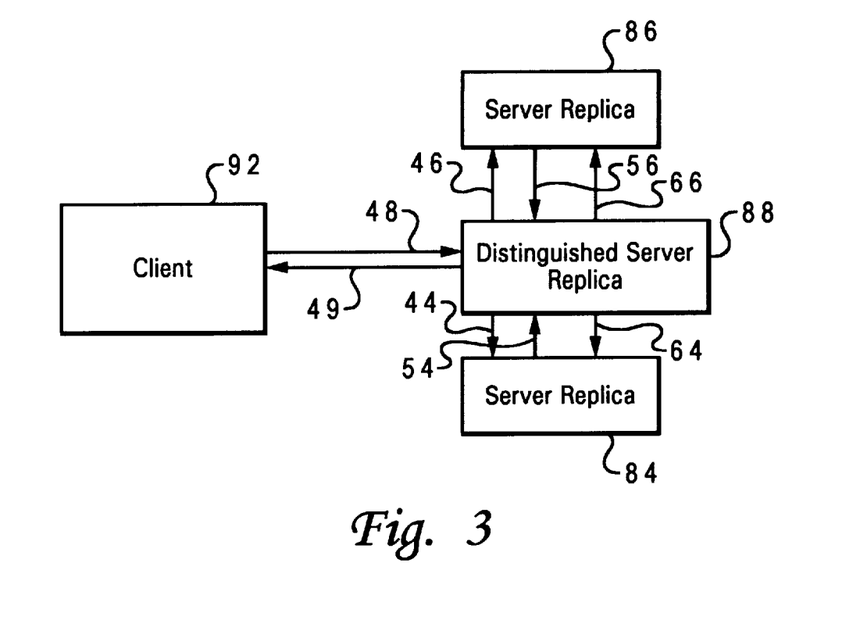
FIG. 3 depicts a block diagram illustrative of interactions between a client and replicated servers during the execution of an information update request, in accordance with a preferred embodiment of the present invention.

FIG. 3 depicts a block diagram illustrative of interactions between client 92 and a group of replicated servers (i.e., 84, 86, and 88) during the execution of an information update request, in accordance with a preferred embodiment of the present invention. A user request for update 48 is sent directly to distinguished server replica 88 (e.g. via the POST operation in the HTTP protocol). Equivalently, a client may send the request to either replica 84 or 86, which in turn redirects the client to distinguished server replica 88 (e.g. via a "See Other" response of the standard HTTP protocol). Upon receiving request 48, distinguished server replica 88 is synchronized with replicas 84 and 86 utilizing messages 44, 46, 54, 56, 64, and 66, which belong to the ordering protocol described herein. Messages 44, 46, 54, 56, 64, and 66 serve to ensure that all replicas receive the update request and execute it in the same order with respect to previous and future update requests, thereby maintaining the consistency of the replicated server state. After distinguished server replica 88 executes the ordering protocol and steps necessary to carry out the client s request (e.g., see block 166 of FIG. 5 and FIG. 6 herein), distinguished server replica 88 sends back a reply 49 containing a response to the client's request.

Figure 4:
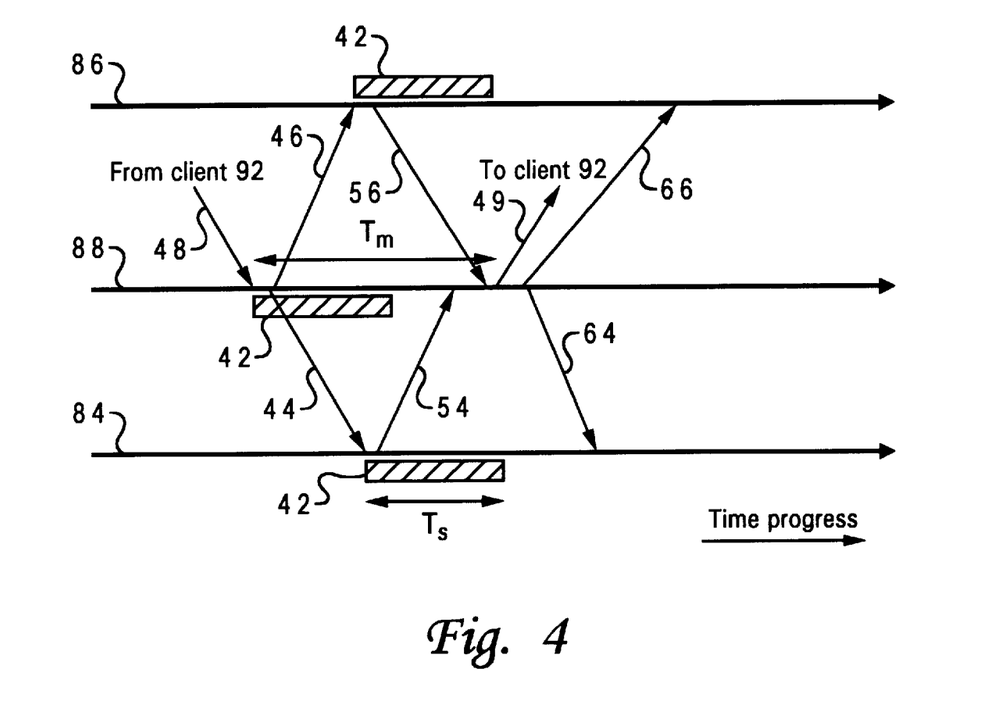
FIG. 4 illustrates a timing diagram of interactions between a client and replicated servers during the execution of an information update request in accordance with a preferred embodiment of the present invention.

FIG. 4 illustrates a timing diagram illustrating interactions between client 92 and a group of replicated servers (i.e., 84, 86, and 88) during the execution of an information update request in accordance with a preferred embodiment of the present invention. In the timing diagram depicted in FIG. 4, time proceeds from left to right, and angled arrows represent the messages illustrated previously in FIG. 3. Two important features of the present invention are illustrated in FIG. 4. Specifically, the execution of request 42 begins as soon as message 48 is available to distinguished server replica 88. Those skilled in the art can appreciate that this arrangement differs from traditional multicast ordering configurations in which the execution is delayed until after the distinguished replica 88 receives both messages 54 and 56, and replicas 84 and 86 receive messages 64 and 66, respectively. The purpose of such a delay in traditional multicast ordering protocols is to ensure that the distinguished server replica processes the request in the same order as the other replicas. In the present invention, however, request 42 proceeds in a "tentative mode" in which the effects of the update are stored in temporary storage. Execution of the "tentative mode" does not result in any permanent updates to the data structure of the service. Execution of the "tentative mode" also does not reflect on subsequent retrieval operations until the "tentative mode" is lifted. The "tentative mode" is lifted as soon as the distinguished server replica 88 receives both messages 54 and 56. When the "tentative mode" is finally lifted, the effects of the update become permanent and henceforth affect future retrieval operations.

Thus, it can be appreciated by those skilled in the art that the results of processing request 42 via the multicast ordering protocol described herein are available to the client sooner than delaying execution of the request until messages 54 and 56 are received as is the case with traditional multicast protocol configurations. Additionally, in traditional multicast protocol configurations, replicas 84 and 86 act to deliver the request to the service program only after they receive messages 64 and 66, respectively. According to the present invention described herein, however, the replicas begin execution of the request in tentative mode as soon as messages 54 and 56 are respectively received. Thus, the results of the update, according to the present invention described herein, are available sooner than is the case with traditional multicast protocol configurations, because the method and system described herein, in accordance with a preferred embodiment of the present invention described, avoids such delays.

Thus, according to the timing diagram depicted in FIG. 4, the service time for a client request 42 is represented as $T_s$, and the time it takes the ordering protocol to deliver the client request in the same order at all replicas is represented as $T_m$. Time $T_m$ represents the time elapsed between the receipt of update request 42 from client 92 until the distinguished server replica 88 receives both messages 54 and 56, respectively. Given these parameters, the distinguished replica can produce a client request at $max(T_s, T_m)$, which computes the larger of the two values $T_s$ and $T_m$ instead of $(T_s+T_m)$ which is typically the case with traditional multicast ordering protocols. Based on these parameters, those skilled in the art can appreciate that up to a 50% reduction in response time during update operations can be achieved via a preferred embodiment of the present invention versus traditional multicast ordering protocols. Note that the replicas abide by the order defined by the distinguished replica when serving the client request. The early delivery of the client request to the server program at the distinguished replica does not result in any perceived inconsistencies as far as the clients are concerned. The "tentative mode" of execution hides any temporary inconsistency that results from delivering the request at the distinguished replica 88 before replicas 84 and 86 acknowledge the receipt of the request and its processing order (i.e., messages 44 and 46).

Figure 5:
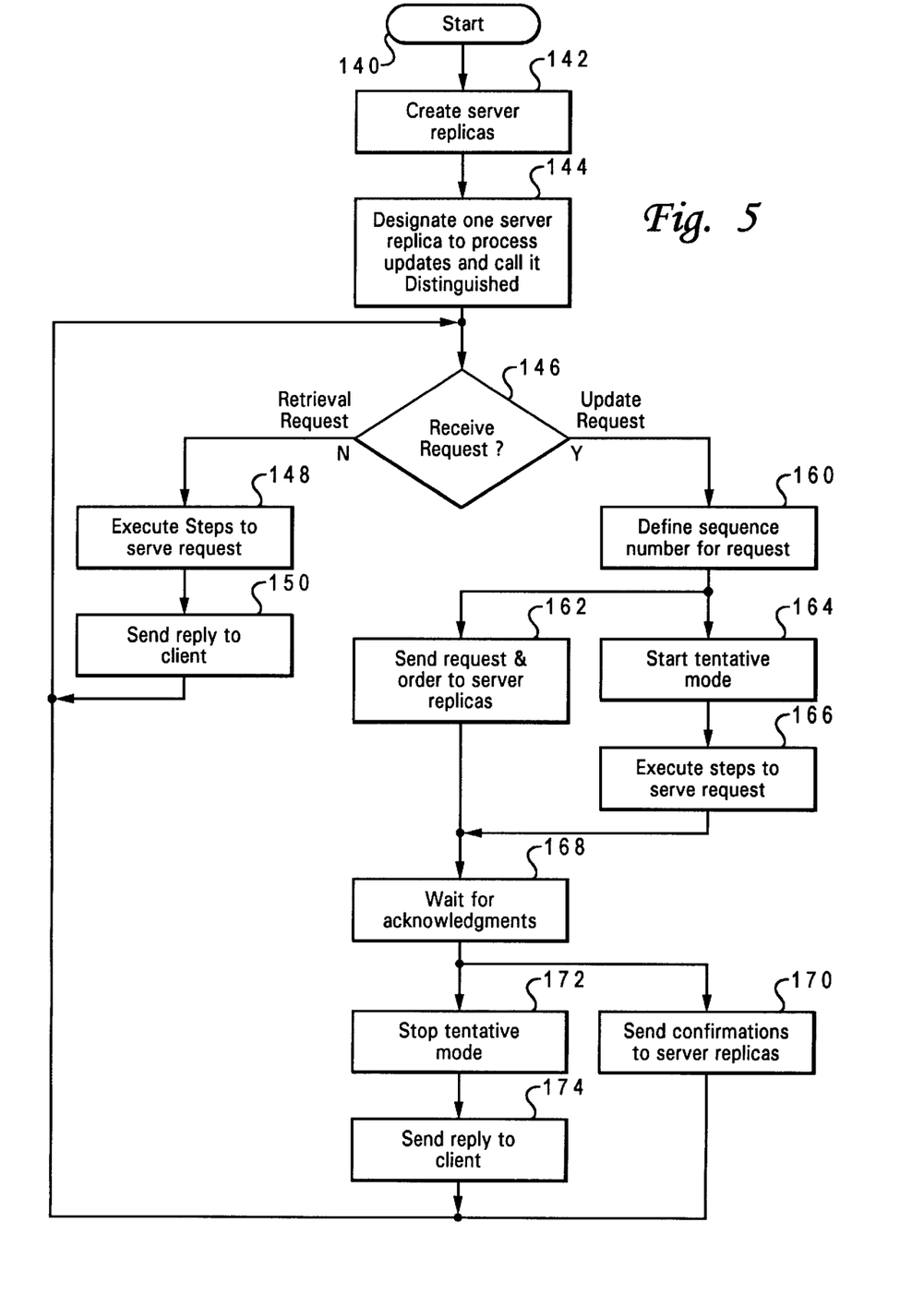
FIG. 5 depicts a flowchart of operations illustrating a method for implementing an improved request ordering protocol via a distinguished server replica, in accordance with a preferred embodiment of the present invention.
Figure 6:
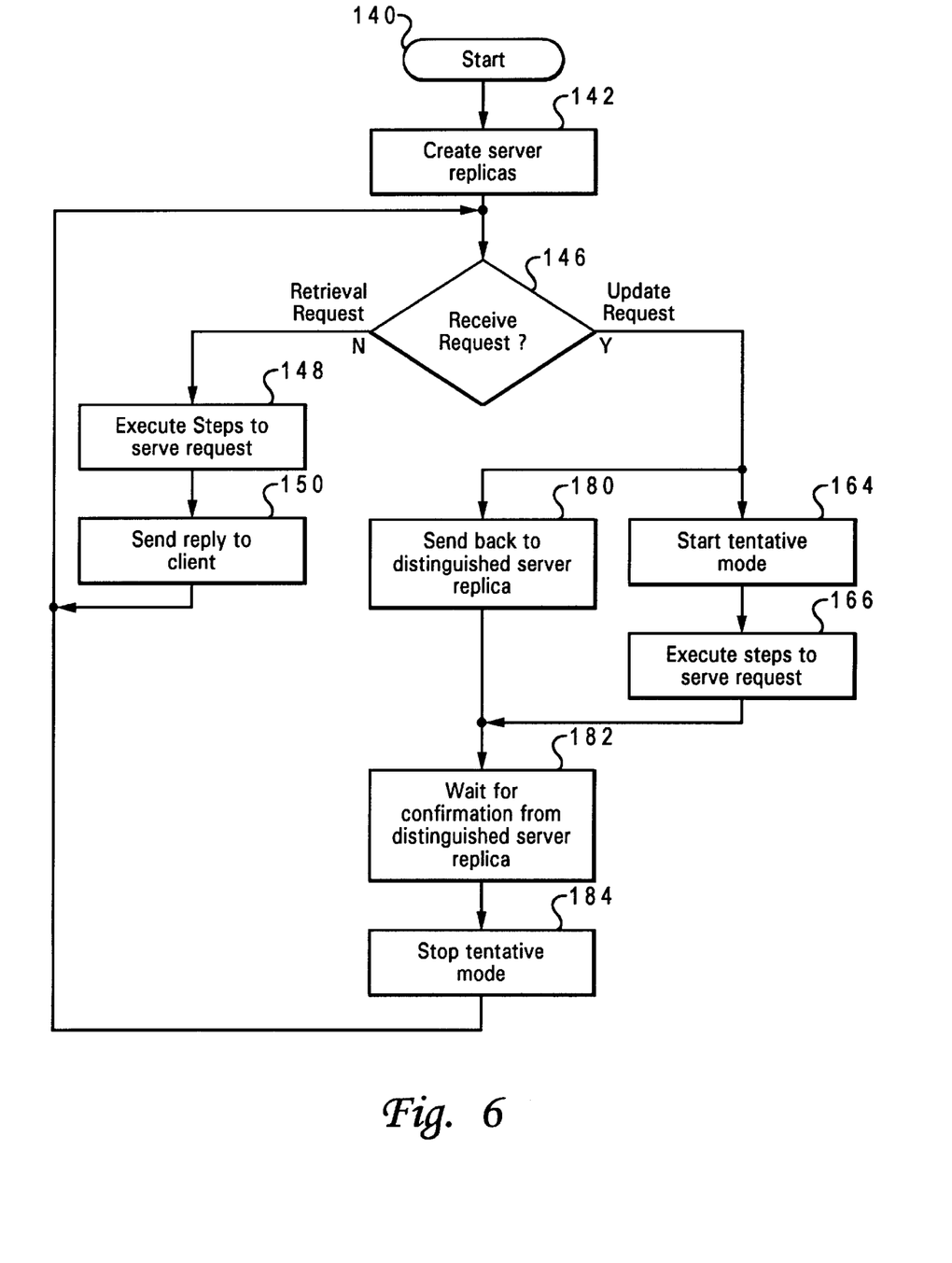
FIG. 6 illustrates a flowchart of operations illustrating a method for implementing an improved request ordering protocol via a general (non-distinguished) server replica, in accordance with a preferred embodiment of the present invention.

FIG. 5 and FIG. 6 illustrate flowcharts of operations illustrating a method for implementing an improved ordering protocol, in accordance with a preferred embodiment of the present invention. FIG. 5 depicts a flowchart of operations illustrating a method for implementing an improved request ordering protocol via a distinguished server replica, in accordance with a preferred embodiment of the present invention. FIG. 6 illustrates a flowchart of operations illustrating a method for implementing an improved request ordering protocol via a general (non-distinguished) server replica, in accordance with a preferred embodiment of the present invention. The operations depicted in the flowcharts of FIG. 5 and FIG. 6 proceed in parallel as a request is being processed at the relevant server replica. Some of the operations described in FIG. 5 and FIG. 6 are common to both types of replicas, and are thus referenced and described with identical reference numerals and labels.

It can be appreciated by those skilled in the art that FIG. 5 and FIG. 6 present a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

It is important to note that, while the present invention has been (and will continue to be) described in the context of a fully functional computer network, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information. It is also important to note that, while FIG. 1 to FIG. 6 depict and describe a configuration in which three server replicas are utilized, any number of server replicas may be also be utilized in accordance with a preferred embodiment of the present invention.

Thus, as depicted at block 140 in FIG. 5, a process is initiated for the reliable and consistent retrieval and updating of information according to client requests. As indicated at block 142, a group of server replicas is created within a computer network. Each server among the group of server replicas replicates a particular network service to ensure that the particular network service remains uninterrupted in the event of a server failure. Thereafter, as illustrated at block 144, a server replica is "distinguished," which can respond to client update requests. The computer network includes at least one client connected to the group of servers or a non-empty subset thereof. A request by a client to retrieve information can be directed to any server replica.

Next, as described at block 146, when a server replica receives a request, a test is performed to determine the type of desired request. If a client request to retrieve information is desired (e.g., message 24, 28, or 26 of FIG. 2), then as indicated at block 148, the client request to retrieve information is executed. Then, as depicted at block 150, the server replica produces a message containing the result of the operation and sends it back to the client (e.g., see message 34, 36, or 38 of FIG. 2). The control is then transferred back, as indicated at block 146, in order to fetch and serve the next request.

If, as described at block 146, a client request to update information stored within a service state (e.g., message 48 for the distinguished replica, and messages 44 and 46 for the replicas 84 and 86, respectively, as indicated in FIG. 3) is accepted, then control processing continues, depending on the server replica executing operation. At the distinguished server replica, control processing continues, as indicated at block 160, wherein the distinguished replica defines an order in which the update request is to be processed with respect to previous and future update requests. Those skilled in the art will appreciate that such ordering can be accomplished utilizing a monotonic sequence number incremented once each time a new update request is desired. Control then bifurcates to two paths that proceed in parallel. Those who are skilled in the art can further appreciate that if the server machine is capable of executing operations in parallel (e.g. through a multi-threaded application program), then a faithful implementation of the flowchart described herein can be readily realized.

As illustrated at block 162, the distinguished server replica sends the request and order information to the other replicas (e.g., messages 44 and 46 to replicas 84 and 86, respectively, as depicted in FIG. 3). Then, in parallel with operations described at block 162 and block 164, the distinguished server replica begins a "tentative mode" of execution, in preparation for executing the client request. Thereafter, as illustrated at block 166, the distinguished server replica begins execution of the client request in a "tentative mode". In this mode, none of the updates become permanent. Old copies of corresponding data items remain at their respective storage locations. Such old copies continue to serve retrieval requests until the "tentative mode" is lifted and new values are permitted to become permanent.

The intent of providing a "tentative mode" is to improve performance by delivering the client request to the service program as soon as possible, while ensuring that no client can perceive the effects of the temporary inconsistency existing between the states of the distinguished replica and the other replicas (i.e. the distinguished replica has already performed an update, while the other replicas have yet to receive the request or obtain knowledge about its execution order). The distinguished server replica thus prepares a response to the client request and stores it in a buffer, pending the lifting of the "tentative mode" restriction. Those skilled in the art will appreciate that various techniques can be utilized to implement a "tentative mode," such as atomic actions, shadowing, etc.

Following execution of the operations depicted at block 166, control at the distinguished service replica proceeds, as illustrated at block 168, wherein the replica pauses to wait for acknowledgments from other replicas that the request and orders have been received (e.g., see messages 54 and 56 of FIG. 3). After receiving these messages, control again splits into two parallel paths, as indicated at blocks 170 and 172. As described at block 170, the distinguished server replica sends confirmation messages to the other replicas (i.e., refer to messages 64 and 66 of FIG. 3 and FIG. 4), informing the replicas that their acknowledgments have been received. In parallel with the operations depicted at block 170, the distinguished server replica lifts the restrictions imposed by the tentative mode, as indicated at block 172 (i.e., "stop tentative mode"). Tentative updates become permanent, and subsequent retrieval operations will show the effects of these updates.

Thereafter, as indicated at block 174, the distinguished server replica releases the response from the buffer and sends it to the client in a message over the network (e.g., see message 49 of FIG. 3 and FIG. 4). After the operations described at blocks 170 and 174 are completed, the operation depicted at block 146 is repeated, awaiting receipt and processing of the next request. Those skilled in the art can appreciate that while the operation described at block 146 indicates that the server processes one request at a time, it is possible to continue serving retrieval requests while the execution of an update request is in progress.

FIG. 6 differs from FIG. 5 in that the operation depicted at block 144 in FIG. 5 (i.e., "designate one server replica to process updates and call it distinguished") is not illustrated in FIG. 6. In addition, the operation described at block 164 in FIG. 5 (i.e., "define sequence number for request") is also not indicated in FIG. 6. In addition, operations indicated at blocks 162, 168, 170, 172, and 174 in FIG. 5 are not included in FIG. 6. In a general replica (i.e., a "non-distinguished" replica), as soon as an update request is received along with its order (e.g., see message 44 or 46 of FIG. 3 and FIG. 4), the replica begins a parallel path similar to the path taken by the distinguished replica. As indicated at blocks 164 and 166, for example, the mechanics of executing the update request in a "tentative mode" is described in the context of a distinguished replica. In parallel with the operations depicted at blocks 164 and 166, the replica sends back a message to the distinguished server replica (e.g., see message 54 or message 56 of FIG. 3 and FIG. 4), as described beginning at block 180 of FIG. 6. This message acknowledges the receipt of the order message (e.g., see message 44 or 46 of FIG. 3 and FIG. 4).

When the operations described at blocks 166 and 180 are complete, the replica waits for a confirmation message from the distinguished server replica (e.g., message 64 or 66 of FIG. 3 and FIG. 4), as depicted at block 182 of FIG. 6. When this message arrives, the replica lifts the restriction of the tentative mode of operation (e.g., similar to the case of the distinguished server replica), as illustrated at block 184. Thereafter, the operation at block 146 is repeated, awaiting the next request prior continuing processing subsequent logical operations. It can be appreciated by those skilled in the art that while the aforementioned description is described in the context of only one operation running at a time, the server can execute additional retrieval information while the update request is in progress.

FIG. 3 to FIG. 6 describes how an ordering protocol continues to operate in the presence of communication failures. If a client request 47 is lost, the client utilizes "time-outs" and re-transmissions (e.g., TCP/IP). If either of messages 44 or 46 are lost, the distinguished replica will time-out and retransmit either or both messages as appropriate. If either message 54 or message 56 is lost, then either replica 84 or replica 86 will use time-outs and retransmissions as appropriate. The same treatment applies if either message 64 or 66 are lost.

FIG. 3 to FIG. 6 also demonstrates how the ordering protocol continues to operate in the presence of host failures. If either replica 84 or 86 fails, the failed replica is removed from service with no adverse effect on distinguished server replica 88 or client 92. If distinguished server replica 88 fails, replicated servers 84 and 86 elect a new distinguished server replica and resume operation utilizing a standard protocol for leader election. Should the failure occur during the processing of an ordering protocol for a client s update request, handling of the client request and its processing order will depend on where the failure occurs during the ordering protocol.

If the failure occurs before the distinguished server replica sends messages 44 and 46, but after delivering the request to the service program 42, the new distinguished server simply assigns a new order for request processing and resumes operations. Note that no permanent damage can occur even though the failed distinguished server replica may have processed the client request due to the use of a tentative mode operation. This is so because the distinguished server replica cannot externalize any effect due to receiving that particular client request during the tentative mode of operation, which is only lifted when the corresponding messages 54 and 56 are also received (i.e., which is impossible in this scenario, since these messages are not generated until messages 44 and 46 are received). This failure scenario is also applicable to the case where distinguished server replica 88 fails after sending and losing messages 44 and 46. In addition, this scenario is applicable to the case where distinguished server replica 88 fails after sending message 44 (i.e., or 46) and replica 84 (i.e., or 86) fails after receiving one message and losing another message.

Another failure scenario to be considered in accordance with a preferred embodiment of the present invention, is the case where distinguished server replica 88 fails prior to receiving messages 54 and 56. In this instance, no permanent effect will be externalized to clients, because of the use of the tentative mode (i.e., which is only lifted when both messages are received). The order of executing the update is available at either 84 or 86 (i.e., if the lost order had been handled in the previous scenario). In this case, both server replicas can agree on the order and continue execution.

An additional failure scenario to consider is the case where distinguished server replica 88 fails before sending messages 64 and 66 (i.e., or equivalently, if both messages are lost), and after receiving messages 54 and 56. In this case, the effects of the update become permanent at distinguished server replica 88 and may be externalized to clients through retrieval operations. However, because the order of executing the update is available to replicas 84 and 86 (i.e., which both remain active in a tentative mode), replicas 84 and 86 can agree on the ordering during leader election, while remaining consistent with the view that any client might have acquired via subsequent update operations. Such a scenario continues to operate even if either replica 84 or 86 also fails. Furthermore, either replica 84 or 86 can generate the response message 49 to the client if necessary.

Those skilled in the art will recognize the two-phase nature of the ordering protocol described and illustrated herein, in accordance with a preferred embodiment of the present invention. In the first phase (i.e., messages 44 and 46), the distinguished replica prepares the other replicas to accept the update request and its order, and then in a second phase (i.e., messages 64 and 66) allows the other replicas to make the tentative order and effects permanent. Those skilled in the art can recognize that traditional two-phase ordering protocols (e.g, such as two-phase multicast protocols) are subject to blocking if the distinguished server replica fails prior to confirming the agreement to all surviving replicated servers. However, the ordering protocol described herein is immune from this problem, because the ordering protocol takes advantage of the fact that all receivers are replicas and the new distinguished server adopts the order defined by the failed distinguished server without affecting service semantics. Previous protocols did not exploit or take advantage of such an important feature, preferring instead to offer generalized ordering facility to entities that may not be necessarily replicated. Such a generality functions at the expense of a larger response time, and in the case of a replicated server, this generality is not relevant.

The protocol operations described permit client request processing to occur at one distinguished replica before all replicas agree on a processing order. Previous protocols delayed request processing until an agreement was reached. The improved protocol operations described herein allow a distinguished replica to release the response to the client (i.e., if it is already computed) as soon as the replicas receive a defined order. The improved protocol operations described herein further tolerate failures in communications and hosts, without being susceptible to blocking. Additionally, the improved protocol described herein, in accordance with a preferred embodiment of the present invention, also promotes coupling of the ordering operation with the release of output, while effecting permanent changes, thereby ensuring the safety of the server operations, along with increased performance. Previous ordering protocols, such as multicast protocols, did not handle output actions at all.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method for reliably and consistently delivering client requests in a computer network having at least one client connectable to one or more servers among a plurality of servers, wherein each server among said plurality of servers replicates a particular network service to ensure that said particular network service remains uninterrupted in the event of a server failure, said method comprising the steps of:

designating a particular server among said plurality of servers to manage client requests which seek to update a particular network service state, prior to any receipt of a client request which seeks to update said particular network service state by any remaining servers among said plurality of servers;

specifying an executable order in which client requests which seek to update said particular network service state are processed among said remaining servers, such that said executable order, upon execution, sequences said client request which seeks to update said particular network service state with respect to all prior and subsequent client requests;

automatically transferring to said remaining servers from said particular server, said executable order and said client request which seeks to update said particular network service state, in response to initiating said client request; and processing in a tentative mode at said particular server, said client request which seeks to update said particular network service state, without waiting for said executable order to be executed through to completion among said remaining servers, thereby promoting a reliable and consistent ordering of client request messaging deliveries and an overall reduction in server response time.

2. The method of claim 1 wherein the step of designating a particular server among said plurality of servers to manage client requests which seek to update said particular network service state, prior to any receipt of a client request which seeks to update said particular network service state by any remaining servers among said plurality of servers, further comprises the step of:

designating a particular server among said plurality of servers to manage client requests which seek to update said particular network service state, prior to any receipt of a client request which seeks to update said particular network service state by any remaining servers among said plurality of servers, wherein said particular server comprises a designated server.

3. The method of claim 2 wherein the step of tentatively processing in a tentative mode at said particular server, said client request which seeks to update said particular network service state, without waiting for said executable order to be executed through to completion among said remaining servers, further comprises the steps of:

forming a tentative response to said client request which seeks to update said particular server in said tentative mode; and storing said tentative response within a buffer at said designated server, such that during said tentative mode, said tentative response does not alter the result of any client requests to retrieve data.

4. The method of claim 3 further comprising the steps of:

terminating said tentative mode, when each remaining server transmits a message to said particular server acknowledging receipt of said executable order and said client request which seeks to update said particular network service state;

releasing said tentative response from said buffer, in response to terminating said tentative mode;

transferring said tentative response to said at least one client, in response to releasing said tentative response from said buffer;

permitting updates to said particular network server resulting from said tentative response to become permanent, thereby altering future responses to client requests to retrieve data.

5. The method of claim 4 wherein the step of designating a particular server among said plurality of servers to manage client requests which seek to update said particular network service state, prior to any receipt of a client request which seeks to update said particular network service state by any remaining servers among said plurality of servers, further comprises the step of:

electing an alternative server among said plurality of servers to manage client requests which seek to update said particular network service state, if said particular server fails.

6. The method of claim 5 further comprising the step of:

permitting any server among said plurality of servers to respond to and process a client request to retrieve data at any time.

7. The method of claim 6 wherein the step of specifying an executable order in which client requests which seek to update said particular network service state are processed among said remaining servers, such that said executable order, upon execution, sequences said client request which seeks to update said particular network service state with respect to all prior and subsequent client requests, further comprises the step of:

specifying an executable order in which client requests which seek to update said particular network service state are processed among said remaining servers, such that said executable order, upon execution, sequences said client request which seeks to update said particular network service state with respect to all prior and subsequent client requests, wherein said executable order comprises an ordering protocol.

8. The method of claim 7 wherein the step of specifying an executable order in which client requests which seek to update said particular network service state are processed among said remaining servers, such that said executable order, upon execution, sequences said client request which seeks to update said particular network service state with respect to all prior and subsequent client requests, wherein said executable order comprises an ordering protocol, further comprises the step of:

specifying an executable order in which client requests which seek to update said particular network service state are processed among said remaining servers, such that said executable order, upon execution, sequences said client request which seeks to update said particular network service state with respect to all prior and subsequent client requests, wherein said executable order is communicated via a two-phase ordering protocol immune from blocking if said particular server fails.

9. The method of claim 8 wherein the step of designating a particular server among said plurality of servers to manage client requests which seek to update said particular network service state, prior to any receipt of a client request which seeks to update said particular network service state by any remaining servers among said plurality of servers, further comprises the step of:

designating a particular server among said plurality of servers to manage client requests which seek to update said particular network service state, prior to any receipt of a client request which seeks to update said particular network service state by any remaining servers among said plurality of servers, wherein each server among said plurality of servers comprises a server replica.

10. The method of claim 9 wherein the step of specifying an executable order in which client requests which seek to update said particular network service state are processed among said remaining servers, such that said executable order, upon execution, sequences said client request which seeks to update said particular network service state with respect to all prior and subsequent client requests, further comprises the step of:

specifying an executable order in which client requests which seek to update said particular network service state are processed among said remaining servers, such that said executable order, upon execution, continues to function in the event of a communication failure within said plurality of servers.

11. The method of claim 10 further comprising the steps of:

transferring to a remaining server among said plurality of servers, said client request which seeks to update said particular network service state tentatively processing in a tentative mode at said remaining server, said client request which seeks to update said particular network service state, without waiting for said two-phase ordering protocol to be executed through to completion among said remaining servers, including said particular server;

transmitting to said distinguished server from said remaining server, a message acknowledging receipt of said executable order and said client request which seeks to update said particular network service state by said remaining server, at the end of a first phase of said two-phase ordering protocol;

transferring a confirmation message from said distinguished server to said remaining server upon successful transmission to said distinguished server from said remaining server of said message acknowledging receipt of said executable order and said client request which seeks to update said particular network by said remaining server at the end of a second phase of said two-phase protocol; and terminating said tentative of mode at said remaining server following the completion of said second phase of said two-phase ordering protocol.

12. The method of claim 11 further comprising the step of:

recovering the results of a client request which seeks to update said particular network service state in the event of a host or communication failure within said plurality of servers.

13. The method of claim 12 further comprising the step of:

recovering a client request which seeks to update said particular network service state in the event of a host or communication failure within said plurality of servers.

14. A system for ordering client requests in a computer network having at least one client connectable to one or more servers among a plurality of servers, wherein each server among said plurality of servers replicates a particular network service to ensure that said particular network service remains uninterrupted in the event of a server failure, said system comprising:

means for designating a particular server among said plurality of servers to manage client requests which seek to update a particular network service state, prior to any receipt of a client request which seeks to update said particular network service state by any remaining servers among said plurality of servers;

means for specifying an executable order in which client requests which seek to update said particular network service state are processed among said remaining servers, such that said executable order, upon execution, sequences said client request which seeks to update said particular network service state with respect to all prior and subsequent client requests;

means for automatically transferring to said remaining servers from said particular server, said executable order and said client request which seeks to update said particular network service state, in response to initiating said client request; and means for tentatively processing in a tentative mode at said particular server, said client request which seeks to update said particular network service state, without waiting for said executable order to be executed through to completion among said remaining servers, thereby promoting a reliable and consistent ordering of client request messaging deliveries and an overall reduction in server response time.

15. The system of claim 14 wherein said means for designating a particular server among said plurality of servers to manage client requests which seek to update said particular network service state, prior to any receipt of a client request which seeks to update said particular network service state by any remaining servers among said plurality of servers, further comprises:

means for designating a particular server among said plurality of servers to manage client requests which seek to update said particular network service state, prior to any receipt of a client request which seeks to update said particular network service state by any remaining servers among said plurality of servers, wherein said particular server comprises a designated server.

16. The system of claim 15 wherein said means for tentatively processing in a tentative mode at said particular server, said client request which seeks to update said particular network service state, without waiting for said executable order to be executed through to completion among said remaining servers, further comprises:

means for forming a tentative response to said client request which seeks to update said particular server in said tentative mode; and means for storing said tentative response within a buffer at said designated server, such that during said tentative mode, said tentative response does not alter the result of any future client requests to retrieve data.

17. The system of claim 16 further comprising:

means for terminating said tentative mode, when each remaining server transmits a message to said particular server acknowledging receipt of said executable order and said client request which seeks to update said particular network service state;

means for releasing said tentative response from said buffer, in response to terminating said tentative mode;

means for transferring said tentative response to said at least one client, in response to releasing said tentative response from said buffer;

means for permitting updates to said particular network server resulting from said tentative response to become permanent, thereby altering future responses to client requests to retrieve data.

18. The system of claim 17 wherein said means for designating a particular server among said plurality of servers to manage client requests which seek to update said particular network service state, prior to any receipt of a client request which seeks to update said particular network service state by any remaining servers among said plurality of servers, further comprises:

means for electing an alternative server among said plurality of servers to manage client requests which seek to update said particular network service state, if said particular server fails.

19. The system of claim 18 further comprising:

means for permitting any server among said plurality of servers to respond to and process a client request to retrieve data at any time.

20. The system of claim 19 wherein said means for specifying an executable order in which client requests which seek to update said particular network service state are processed among said remaining servers, such that said executable order, upon execution, sequences said client request which seeks to update said particular network service state with respect to all prior and subsequent client requests, further comprises:

means for specifying an executable order in which client requests which seek to update said particular network service state are processed among said remaining servers, such that said executable order, upon execution, sequences said client request which seeks to update said particular network service state with respect to all prior and subsequent client requests, wherein said executable order comprises an ordering protocol.

21. The system of claim 20 wherein said means for specifying an executable order in which client requests which seek to update said particular network service state are processed among said remaining servers, such that said executable order, upon execution, sequences said client request which seeks to update said particular network service state with respect to all prior and subsequent client requests, wherein said executable order comprises an ordering protocol, further comprises:

means for specifying an executable order in which client requests which seek to update said particular network service state are processed among said remaining servers, such that said executable order, upon execution, sequences said client request which seeks to update said particular network service state with respect to all prior and subsequent client requests, wherein said executable order is communicated via a two-phase ordering protocol immune from blocking if said particular server fails.

22. The system of claim 21 wherein said means for designating a particular server among said plurality of servers to manage client requests which seek to update said particular network service state, prior to any receipt of a client request which seeks to update said particular network service state by any remaining servers among said plurality of servers, further comprises:

means for designating a particular server among said plurality of servers to manage client requests which seek to update said particular network service state, prior to any receipt of a client request which seeks to update said particular network service state by any remaining servers among said plurality of servers, wherein each server among said plurality of servers comprises a server replica.

23. The system of claim 22 wherein said means for specifying an executable order in which client requests which seek to update said particular network service state are processed among said remaining servers, such that said executable order, upon execution, sequences said client request which seeks to update said particular network service state with respect to all prior and subsequent client requests, further comprises:

means for specifying an executable order in which client requests which seek to update said particular network service state are processed among said remaining servers, such that said executable order, upon execution, continues to function in the event of a communication failure within said plurality of servers.

24. The system of claim 23 further comprising:

means for transferring to a remaining server among said plurality of servers, said client request which seeks to update said particular network service state;

means for tentatively processing in a tentative mode at said remaining server, said client request which seeks to update said particular network service state, without waiting for said two-phase ordering protocol to be executed through to completion among said remaining servers, including said particular server;

means for transmitting to said distinguished server from said remaining server, a message acknowledging receipt of said executable order and said client request which seeks to update said particular network service state by said remaining server, at the end of a first phase of said two-phase ordering protocol;

means for transferring a confirmation message from said distinguished server to said remaining server upon successful transmission to said distinguished server from said remaining server of said message acknowledging receipt of said executable order and said client request which seeks to update said particular network by said remaining server at the end of a second phase of said two-phase ordering protocol; and means for terminating said tentative of mode at said remaining server following the completion of said second phase of said two-phase ordering protocol.

25. The system of claim 24 further comprising:

means for recovering the results of a client request which seeks to update said particular network service state in the event of a host or communication failure within said plurality of servers.

26. The system of claim 25 further comprising:

means for recovering a client request which seeks to update said particular network service state in the event of a host or communication failure within said plurality of servers.

* * * * *